(12) United States Patent
Okuhata

(10) Patent No.: US 7,095,995 B2
(45) Date of Patent: Aug. 22, 2006

(54) DIVERSITY RECEIVER AND ORTHOGONAL FREQUENCY DIVISION MULTIPLEXED SIGNAL RECEIVING METHOD

(75) Inventor: Yasuhide Okuhata, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 537 days.

(21) Appl. No.: 10/416,229

(22) PCT Filed: Oct. 19, 2001

(86) PCT No.: PCT/JP01/09211

§ 371 (c)(1),
(2), (4) Date: May 8, 2003

(87) PCT Pub. No.: WO02/39633

PCT Pub. Date: May 16, 2002

(65) Prior Publication Data

US 2004/0038651 A1    Feb. 26, 2004

(30) Foreign Application Priority Data

Nov. 10, 2000 (JP) .............................. 2000-342808

(51) Int. Cl.
*H04B 1/06* (2006.01)
*H04B 7/00* (2006.01)

(52) U.S. Cl. .................................. 455/273; 455/276.1

(58) Field of Classification Search ........ 455/132–135, 455/137, 140, 277.1, 277.2, 273, 275, 276.1; 375/347; 370/203, 208

See application file for complete search history.

(56) References Cited

U.S. PATENT DOCUMENTS 5,949,796 A * 9/1999 Kumar ...................... 370/529
6,628,606 B1 * 9/2003 Hong et al. ................. 370/208
6,700,865 B1 * 3/2004 Yamamoto et al. ......... 370/208
6,795,392 B1 * 9/2004 Li et al. ..................... 370/210
6,922,570 B1 * 7/2005 Awater et al. .............. 455/561

FOREIGN PATENT DOCUMENTS

EP    1 041 736    10/2000

(Continued)

OTHER PUBLICATIONS

Written Notification of Reason for Refusal dated Aug. 18, 2004 for JP 2000-342808.

(Continued)

*Primary Examiner*—Nguyen T. Vo
(74) *Attorney, Agent, or Firm*—Eric J. Robinson; Robinson Intellectual Property Law Office, P.C.

(57) ABSTRACT

A technique for stably receiving an orthogonal frequency division multiplexed signal by means of a simple structure. Delay circuits 9–11 add delay times to the signals simultaneously received by antennas 1–4 in such a way that the delay time difference between any two signals is the reciprocal or more of the bandwidth allocated to one subcarrier of orthogonal frequency division multiplex. Thus, the signal synthesized by a mixer 12 can be assumed to be substantially equivalent to the received signal in a multipath environment. Since the delay time differences among the signals simultaneously received by the antennas 1–4 are sufficiently shorter than the length of the guard interval section, the margin prepared for actual arrival of a delay wave because of multipath is sufficiently ensured.

5 Claims, 2 Drawing Sheets

FOREIGN PATENT DOCUMENTS

| | | |
|---|---|---|
| EP | 1 093 268 | 4/2001 |
| JP | 09-181699 | 7/1997 |
| JP | 10-107777 | 4/1998 |
| JP | 11205290 A * | 7/1999 |
| JP | 2000-278243 | 10/2000 |
| JP | 2001-203666 | 7/2001 |
| WO | WO 2004/051882 A1 * | 6/2004 |

OTHER PUBLICATIONS

*International Search Report*, Dec. 11, 2001.
*International Preliminary Examination Report*, mailed Mar. 25, 2003.

* cited by examiner

DIVERSITY RECEIVER AND ORTHOGONAL FREQUENCY DIVISION MULTIPLEXED SIGNAL RECEIVING METHOD

TECHNICAL FIELD

The present invention relates to a diversity receiver for receiving radio signals with a plurality of reception antennas, and more particularly to a diversity receiver for receiving radio signals which were subjected to orthogonal frequency division multiplex on the transmission side.

BACKGROUND ART

As a digital radio signal transmission system, an orthogonal frequency division multiplex (OFDM) system is known.

With this orthogonal frequency division multiplex system, a digital signal is multiplexed by using a number of subcarriers having different frequencies to transmit the digital signal efficiently. With the orthogonal frequency division multiplex, a guard interval section is disposed in front of an effective symbol section so that the reception characteristics can be prevented from being degraded by inter-symbol interference in a multipath environment.

An antenna switching type diversity receiver such as shown in FIG. 2 is known which can mitigate the influence of fading during mobile reception of radio signals subjected to orthogonal frequency division multiplex.

In a conventional diversity receiver shown in FIG. 2, signals received by respective antennas 15 to 18 are amplified by LNSs 19 to 22 and input to a selector 23. In response to a select signal supplied from a demodulator 25, the selector 23 selects one received signal and inputs it to a tuner 24. The tuner 24 frequency-converts a radio frequency (RF) in a desired band into an intermediate frequency (IF) signal and sends it to a demodulator 25.

The tuner 24 detects a signal level of the received signal and notifies the signal level to the demodulator 25 by using a received signal strength indication (RSSI) signal. The demodulator 25 monitors the RSSI signal, and when the signal level becomes a predetermined threshold value or lower, the demodulator 25 controls the selector 23 to select another received signal. If the signal level of the selected received signal is also the threshold value or lower, another received signal is again selected. This operation is repeated.

The conventional diversity receiver cannot detect in advance whether the signal level of a selected received signal becomes higher or lower than that of the presently selected received signal. Therefore, the reception state after selection may become worse than that before selection so that the receiver cannot stably receive signals subjected to orthogonal frequency division multiplex.

If the demodulator 25 shown in FIG. 2 demodulates a digital signal by using an equalizer, the frequency characteristics change abruptly when the received signal is selected. Therefore, equalization errors of the received signal become large, sometimes resulting in a high possibility of demodulation errors.

The conventional diversity receiver requires a circuit for controlling the operation of the selector 23 shown in FIG. 2 to select the received signal, posing a problem of a complicated circuit structure.

The invention has been made in consideration of the above-described circumstance. It is an object of the invention to provide a diversity receiver capable of reliably receiving signals subjected to orthogonal frequency division multiplex, by using a simple structure.

DISCLOSURE OF THE INVENTION

In order to achieve the above-described object, a diversity receiver of the invention comprises: a plurality of antennas for receiving radio signals subjected to orthogonal frequency division multiplex; delay circuits for adding delay times to received signals in such a manner that a delay time difference is given between any two received signals among the received signals simultaneously received with the antennas; a mixer for synthesizing a received signal received with the antenna not coupled to the delay circuit and received signals added with the delay times by the delay circuits; a tuner for frequency-converting a signal in a predetermined band synthesized by the mixer to obtain an intermediate frequency signal; and a demodulator for demodulating the intermediate frequency signal supplied from the tuner to obtain a digital signal.

According to the invention, the delay circuits add delay times to the received signals simultaneously received by the plurality of antennas and subjected to orthogonal frequency division multiplex in such a way that a delay time difference is given between any two received signals. The mixer synthesizes the received signal received with an antenna not coupled to the delay circuit and the received signals added with the delay times by the delay circuits to obtain a demodulated digital signal.

Without switching a plurality of antennas, signals substantially equivalent to signals in a multipath environment can be received by using a simple structure. Degradation during demodulation can be mitigated and signals can be received stably.

It is desired that the delay circuits add the delay times to the received signals simultaneously received by the antennas in such a way that the delay time difference between any two signals is the reciprocal or more of a bandwidth allocated to one subcarrier of orthogonal frequency division multiplex.

It is therefore possible to prevent the signal level after synthesis by the mixer from being lowered by a frequency dip and to stably receive signals.

It is desired that the delay circuits add the delay times to the received signals simultaneously received by the antennas in such a way that the delay time difference between any two signals becomes shorter than the length of a guard interval section of a signal transmitted through the orthogonal frequency division multiplex.

EMBODIMENT OF THE INVENTION

By referring to the accompanying drawing, a diversity receiver according to an embodiment of the invention will be described in detail.

Figure 1:
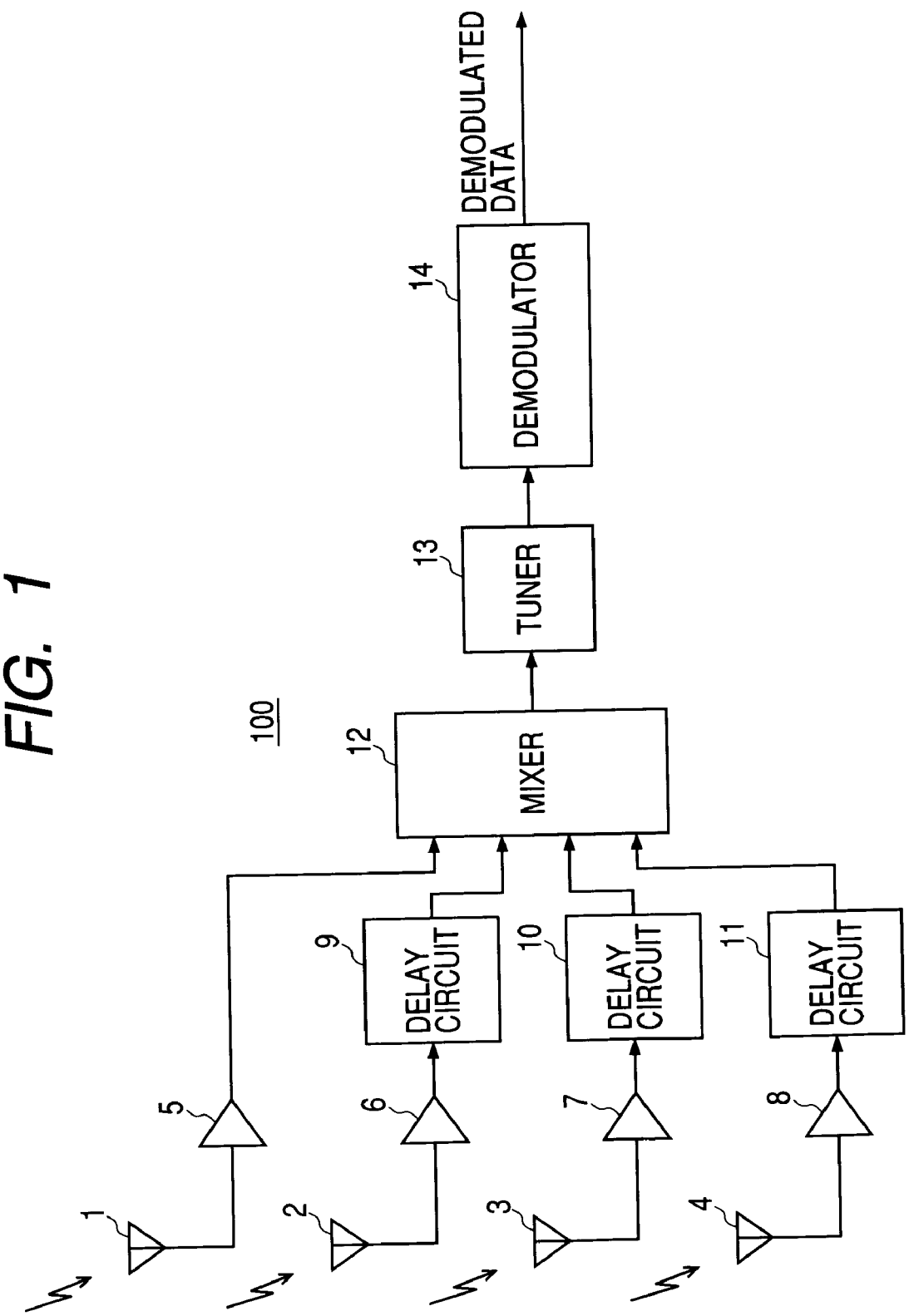
FIG. 1 is a diagram showing the structure of a diversity receiver according to an embodiment of the invention.
Figure 2:
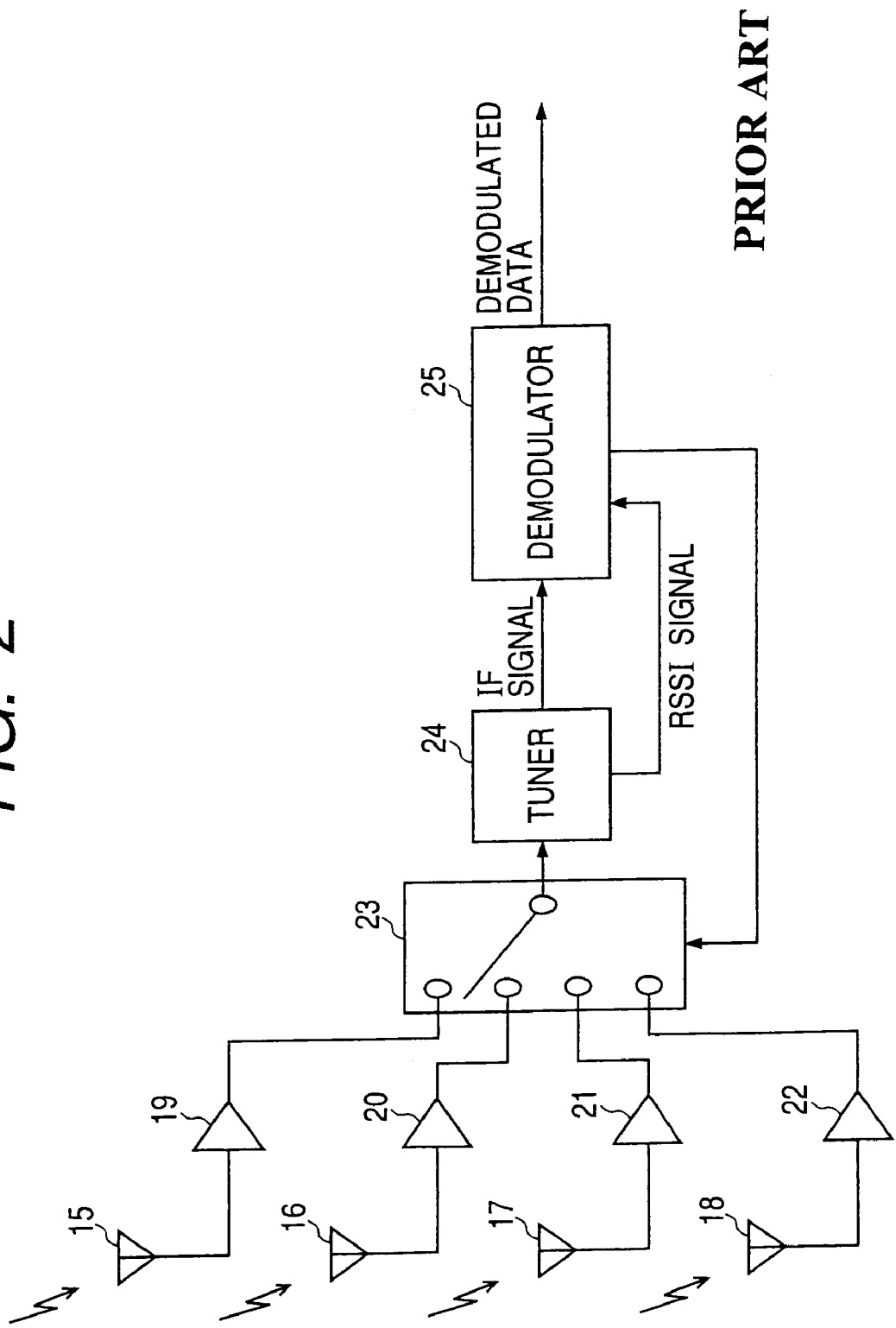
FIG. 2 is a diagram showing the structure of a conventional diversity receiver.

FIG. 1 is a diagram showing the structure of a diversity receiver 100 according to the embodiment of the invention.

As shown, the diversity receiver 100 has a plurality of antennas 1 to 4, a plurality of low noise amplifiers (LNAs) 5 to 8, a plurality of delay circuits 9 to 11, a mixer 12, a tuner 13 and a demodulator 14.

The antennas 1 to 4 receive radio frequency (RF) signals which were subjected to orthogonal frequency division multiplex (OFDM) on the transmission side. The antenna 1 is coupled via LNA 5 to the mixer 12. The antenna 2 is coupled via LNA 6 to the delay circuit 9. The antenna 3 is coupled via LNA 7 to the delay circuit 10. The antenna 4 is coupled via LNA 8 to the delay circuit 11.

RF signals which were subjected to orthogonal frequency division multiplex and received with the antennas 1 to 4 are used for transmitting digital signals by using a number of subcarriers which are orthogonal in a symbol period. One symbol section is divided into an effective symbol section and a guard interval section. The guard interval section is disposed in front of the effective symbol section in the symbol section. The guard interval section is a redundant signal section having a copy of the back portion of the effective symbol section.

The plurality of LNAs 5 to 8 are provided in correspondence with the plurality of antennas 1 to 4 and are low noise amplifiers for amplifying received signals.

LNA 5 sends an amplified received signal to the mixer 12. LNAs 6 to 8 send amplified received signals to corresponding delay circuits 9 to 11.

The plurality of delay circuits 9 to 11 are provided in correspondence with LNAs 6 to 8 and are circuits for adding delay times to the amplified received signals.

The delay circuits 9–11 add delay times to the signals simultaneously received with the antennas 1–4 in such a way that the delay time difference between any two signals is at least the reciprocal 1/B [sec] or more of the bandwidth B [Hz] allocated to one subcarrier. The delay times added by the delay circuits 9 to 11 are sufficiently shorter than the length of the guard interval section.

The mixer 12 synthesizes the received signal amplified by LNA 5 and the received signals added with delay times by the delay circuits 9 to 11.

The mixer 12 sends a signal obtained by synthesizing the received signals to the tuner 13.

The tuner 13 is constituted of a down-converter, a band-pass filter and the like. The tuner 13 selects and derives a received signal which transmits a desired digital signal, and converts the received signal into an intermediate frequency (IF) signal.

The demodulator 14 is constituted of an orthogonal detector, an analog/digital (A/D) converter, a fast Fourier transform (FFT) circuit and the like. The demodulator 14 demodulates the IF signal derived by the tuner 13 to obtain a digital signal transmitted by orthogonal frequency division multiplex, and outputs the digital signal as demodulated data.

The following description is directed to the operation of the diversity receiver 100 according to the embodiment of the invention.

RF signals which were subjected to orthogonal frequency division multiplex on the transmission side are received with the antennas 1 to 4.

The signals received with the antennas 1 to 4 are sent to LNAs 5 to 8 whereat the received signals are amplified.

LNA 5 sends the amplified signal to the mixer 12. LNAs 6 to 8 send the amplified signals to the corresponding delay circuits 9 to 11.

The delay circuits 9 to 11 add delay times to the received signals supplied from LNAs 6 to 8 and send the delayed received signals to the mixer 12.

If the signals simultaneously received with the antennas 1 to 4 are synthesized without adding a delay time to any received signal, the directional characteristics of the plurality of antennas 1 to 4 have strong direction dependency. Therefore, a sufficient signal level cannot be obtained in some cases depending upon the radio wave arrival direction.

On the other hand, if the signals simultaneously received with the antennas 1 to 4 are made to have delay time differences among the received signals, the signals can be assumed to be substantially equivalent to received signals in a multipath environment. Namely, the received signals added with delay times can be regarded as delay waves arriving at the diversity receiver 100. If the delay time is equal to or shorter than the length of the guard interval section, it is possible to demodulate the transmitted signal without inter-symbol interference.

It is therefore possible to suppress the demodulation from being degraded and to stably receive signals subjected to orthogonal frequency division multiplex.

For example, a signal obtained by synthesizing a sine wave signal having a frequency of f [Hz] and the sine wave signal delayed by T [sec] can be expressed by the following equation (1):

$$\sin(2\delta ft)+\sin 2\delta f(t+T) \qquad (1)$$

where $\delta$ is a ratio of the circumference of a circle to its diameter and t is a time variable.

The synthesized signal becomes always 0 for an arbitrary time variable t when the following equation (2) is satisfied:

$$2\delta fT=(2n+1)\delta \qquad (2)$$

where n is an arbitrary integer.

The frequency components of the synthesized signal become 0 at the frequency F [Hz] given by the following equation (3):

$$F=(2n+1)/2T \qquad (3)$$

As seen from the above description, if the delay time difference between two signals simultaneously received with two antennas is T [sec], a dip of frequency components (frequency dip) occurs at each frequency 1/T [Hz] which is the reciprocal of T [sec].

The delay circuits 9 to 11 add delay times to the signals simultaneously received with the plurality of antennas 1 to 4 in such a manner that at least 1/B [sec] delay time difference is given between any two signals, where B [Hz] is the reciprocal of the bandwidth allocated to one subcarrier. Namely, the delay circuits 9 to 11 add delay times to signals simultaneously received with the plurality of antennas 1 to 4 in such a manner that the delay time difference between any two signals is the reciprocal or more of the bandwidth allocated to one subcarrier.

It is therefore possible to prevent the signal level after mixing by the mixer 12 from being lowered by the frequency dip and to stably receive the signals.

If the delay time difference between any two signals among the signals simultaneously received with the plurality of antennas 1 to 4 is set sufficiently shorter than the length of the guard interval section, the margin prepared for actual arrival of a delay wave because of multipath is sufficiently ensured.

The mixer 12 synthesizes the received signal amplified by LNA 5 and the received signals added with the delay times by the delay circuits 9 to 11 and sends the synthesized signal to the tuner 13.

The tuner 13 derives the received signal in the band for transmitting a desired digital signal from the signal synthesized by the mixer 12, and converts it into an IF signal which is sent to the demodulator 14.

The demodulator 14 demodulates the IF signal supplied from the tuner 13 and outputs the digital signal as modulated data.

As described so far, according to the present invention, a delay time difference is given between any two signals among the signals simultaneously received with the plurality of antennas 1 to 4, and the received signals are synthesized. It is therefore possible to prevent the signal level from being lowered and to stably receive signals which were subjected to orthogonal frequency division multiplex.

According to the invention, it is not necessary to switch among received signals as in conventional technology.

The frequency characteristics of a received signal do not change abruptly so that signals which were subjected to orthogonal frequency division multiplex can be stably received. It is not necessary to use the circuit for controlling the selection of received signals. The circuit structure can therefore be simplified.

The invention is not limited only to the above-described embodiment, but various modifications and applications are possible.

For example, although four antennas 1 to 4 receive radio wave signals in the embodiment, the invention is not limited only thereto. By considering the stabilization of the reception characteristics and simplification of the structure, any number of antennas may be used to receive signals which were subjected to orthogonal frequency division multiplex.

If the plurality of antennas 1 to 4 include antennas for receiving horizontally polarized RF signals and antennas for receiving vertically polarized RF, the received signals by these antennas may be synthesized without giving a delay time difference between the received signals.

INDUSTRIAL APPLICABILITY

As described above, according to the present invention, delay times are added to the signals simultaneously received with a plurality of antennas in such a manner that a delay time difference is given between any two received signals, and thereafter the received signals are synthesized and a demodulated digital signal is obtained.

It is therefore possible to stably receive signals subjected to orthogonal frequency division multiplex by using a simple structure.

The invention claimed is:

1. A diversity receiver comprising:
   a plurality of antennas for receiving radio signals subjected to orthogonal frequency division multiplex;
   delay circuits for adding pretermined fixed delay times to received RF signals in such a manner that a predetermined fixed delay time difference is given between any two received RF signals among the received RF signals simultaneously received with said antennas;
   a mixer for synthesizing a received RF signal received with said antenna not coupled to said delay circuit and received RF signals added with the fixed delay times by said delay circuits;
   a tuner for frequency-converting a RF signal in a predetermined band synthesized by said mixer to obtain an intermediate frequency signal; and
   a demodulator for demodulating the intermediate frequency signal supplied from said tuner to obtain a digital signal,
   wherein said delay circuits add the fixed delay times to the received RF signals simultaneously received by said antennas in such a way that the fixed delay time difference between any two received RF signals is the reciprocal or more of a bandwidth allocated to one subcarrier of orthogonal frequency division multiplex.

2. The diversity receiver according to claim 1, wherein said delay circuits add the delay times to the received RF signals simultaneously received by said antennas in such a way that the fixed delay time difference between any two received RF signals becomes shorter than the length of a guard interval section of a signal transmitted through the orthogonal frequency division multiplex.

3. The diversity receiver according to claim 1, wherein said delay circuits add the delay times to the received RF signals simultaneously received by said antennas in such a way that the fixed delay time difference between any two received RF signals becomes shorter than the length of a guard interval section of a signal transmitted through the orthogonal frequency division multiplex.

4. A reception method for a diversity receiver for receiving an orthogonal frequency division multiplexed signal, said method comprising steps of:
   adding predetermined fixed delay times to RF signals simultaneously received with a plurality of antennas in such a manner that a predetermined fixed delay time difference between any two received RF signals is the reciprocal or more of a bandwidth allocated to one subcarrier of orthogonal frequency division multiplex;
   synthesizing the received RF signals; frequency-converting a synthesized RF signal in a predetermined band to obtain an intermediate frequency signal; and
   demodulating the intermediate signal to obtain a digital signal transmitted through orthogonal frequency division multiplex.

5. The reception method according to claim 4, wherein the fixed delay times are added to the RF signals simultaneously received with the plurality of antennas in such a manner that the fixed delay time difference between any two received RF signals becomes shorter than the length of a guard interval section.

* * * * *